United States Patent [19]

Dana

[11] Patent Number: 5,031,572
[45] Date of Patent: Jul. 16, 1991

[54] PET CRAB DWELLING

[76] Inventor: Lanny B. Dana, 7354 Dover La., Dublin, Calif. 94568

[21] Appl. No.: 550,127

[22] Filed: Jul. 9, 1990

[51] Int. Cl.$^5$ ............................................. A01K 63/00
[52] U.S. Cl. ........................................................ 119/5
[58] Field of Search ................................. 119/5, 2, 3, 4

[56] References Cited

U.S. PATENT DOCUMENTS

| | | |
|---|---|---|
| 3,269,578 | 8/1966 | Lewis ..................................... 119/5 |
| 3,283,743 | 11/1966 | Ribelius ................................. 119/5 |
| 3,327,686 | 6/1967 | Holdren ................................. 119/5 |
| 4,204,499 | 5/1980 | Leyua .................................... 119/5 |
| 4,516,529 | 5/1985 | Lotito et al. .......................... 119/5 |
| 4,754,571 | 7/1988 | Riechmann ............................ 119/5 |
| 4,958,593 | 9/1990 | Hurlburt et al. ...................... 119/5 |

*Primary Examiner*—Paul J. Hirsch
*Attorney, Agent, or Firm*—Linval B. Castle

[57] ABSTRACT

A box intended to be submerged within a home aquarium contains a platform for supporting small pet crabs in a dry environment. The box, completely open at the bottom, loosely fits over the platform and receives pumped air which leaks into the aquarium from below platform level. At one end of the platform is a ladder formed of a plastic sheet containing a plurality of holes that enable the crabs to climb upon the platform from the bottom of the aquarium. The box, platform and base upon which it stands are easily disassembled.

9 Claims, 2 Drawing Sheets

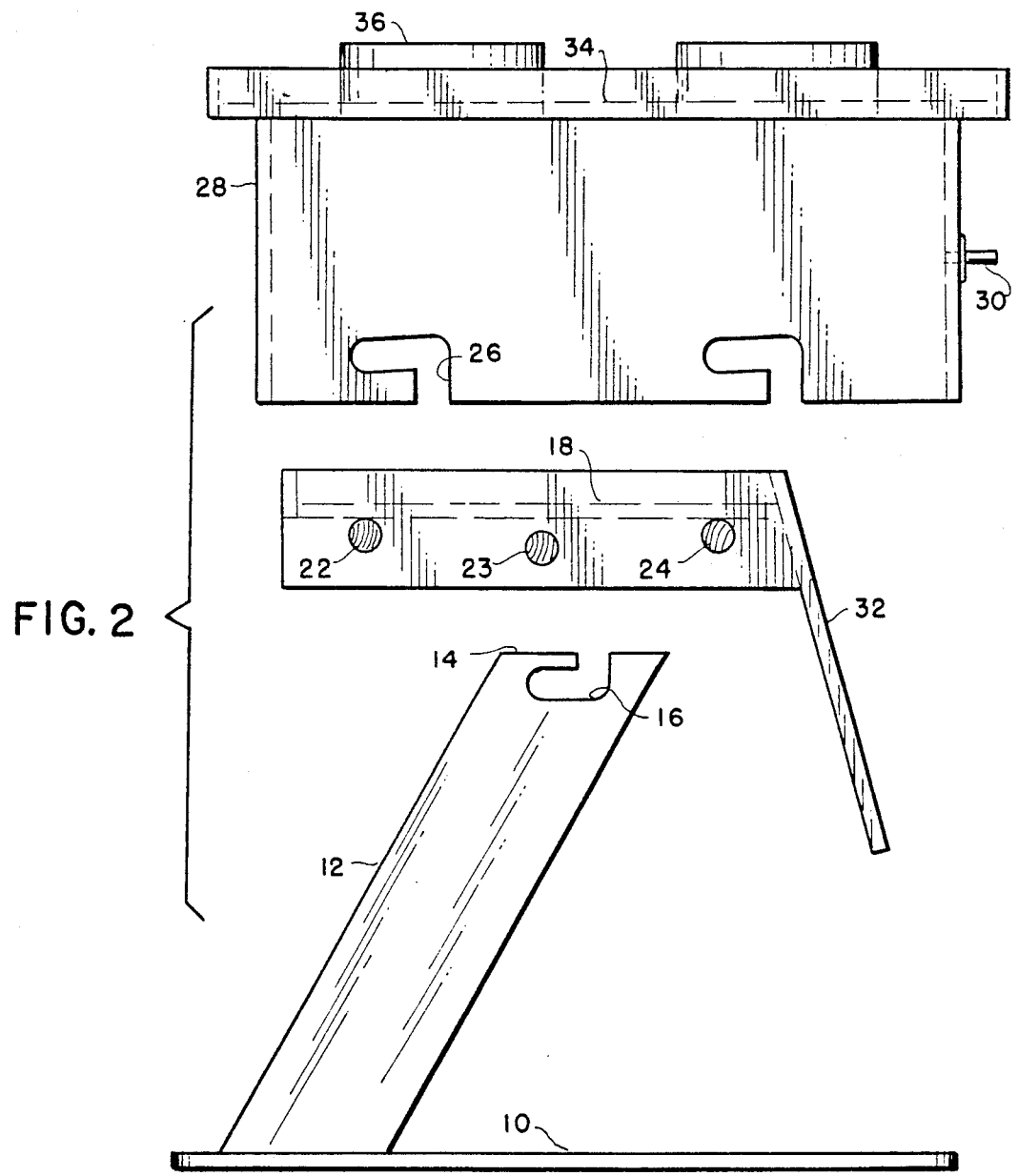

PET CRAB DWELLING

BACKGROUND OF THE INVENTION

This invention relates generally to aquariums and in particular to a crab habitat which is to be submerged in an aquarium but which has a dry air chamber accessible by crabs from the aquarium and through which air flows.

Aquariums found in the modern home often contain, in addition to the usual tropical fish, crustaceans including various types of small and perhaps unusual crabs. In general, crabs are amphibious, requiring water and also desiring dry areas where they may rest in a rocky environment simulating a protected rocky beach area. For housing two or three small pet crabs, a small aquarium containing the usual tropical fish would normally require a dry ledge or rock outcropping above water level upon which the crabs may climb. To prevent the crabs from climbing over the edge of the aquarium, the ledge must either be an "island" spaced from a side of the aquarium or the aquarium wall must be sufficiently high, or the water level low. Such accessories require an unusually large aquarium, normally larger than desired in a private residence.

In the invention to be described, crabs in an aquarium climb up a broad ladder and onto a rock or gravel covered tray enclosed in an inverted submerged air chamber the top of which may also be rock or gravel covered. Outside air is pumped into the inverted chamber and leaks from the bottom edges to supply oxygen to the aquarium. The chamber may be made of any desired material that will remain air tight. Clear plastic chamber walls permit the studying of crabs in the chamber, or the walls of the chamber may be painted to blend with the rock roof to appear as an undersea rock formation surrounded by tropical fish.

BRIEF DESCRIPTION OF THE DRAWINGS

In the drawings that illustrate the preferred embodiment of the invention:

FIG. 2 is a view of the disassembled components of the crab habitat arranged to illustrate its assembly.

DETAILED DESCRIPTION OF THE PREFERRED EMBODIMENT

Figure 1:
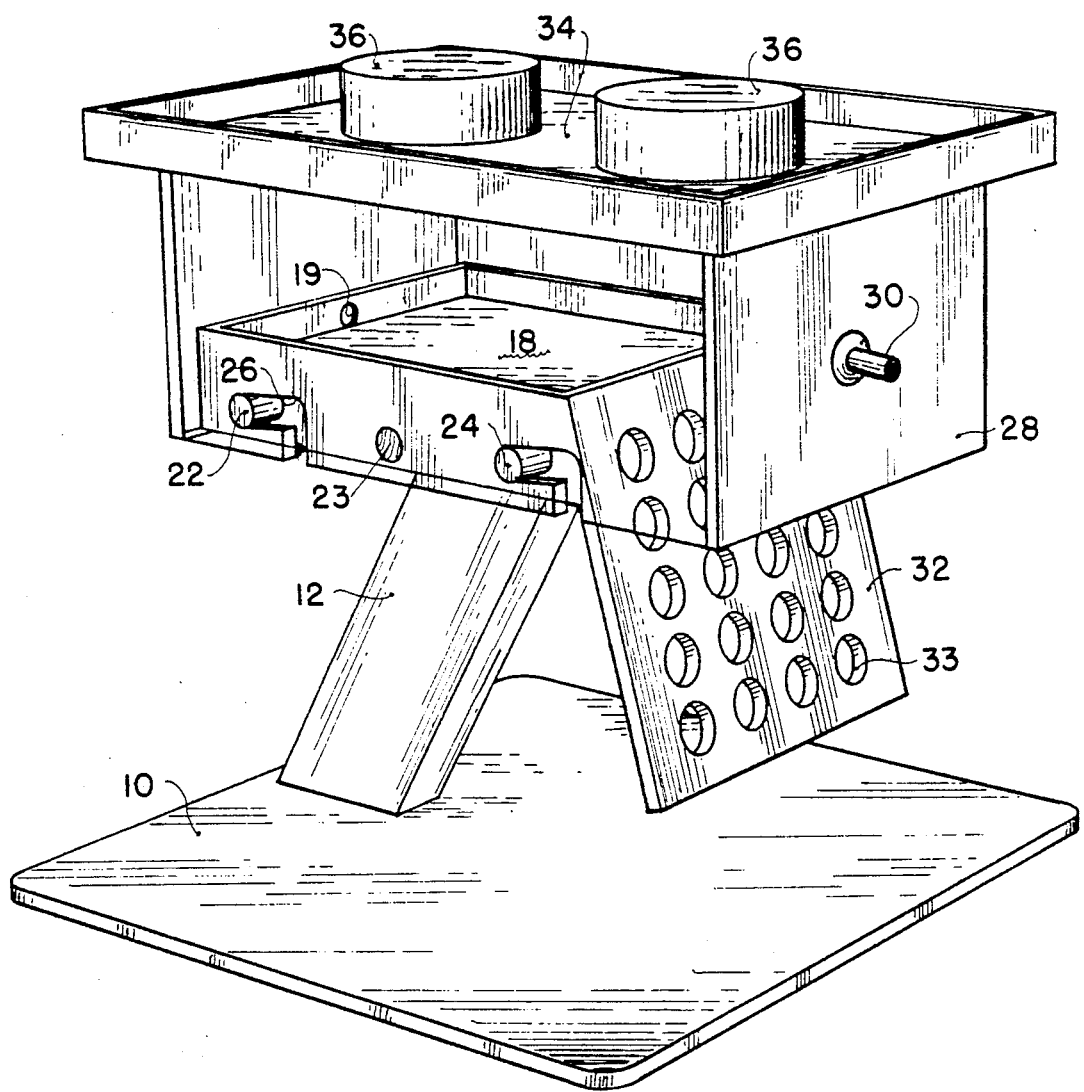
FIG. 1 is a perspective view of the crab habitat illustrated with a transparent wall for interior viewing.

The crab dwelling to be described is a dry housing supported on a support on a base plate in an aquarium. As shown in the figures, the dwelling includes a flat base plate 10, the dimensions of which depend upon the size of the housing. This base plate rests on the floor of an aquarium and may be covered with gravel or other aquarium decorations. Rigidly attached to the top surface of the base plate 10 is an upright support member 12 which preferably is angled up at about 60° from an edge of the plate to terminate in a straight end 14 parallel with the plate 10, as shown in FIG. 2. An "L-shaped" cut-out 16 is formed to open into the straight end 14 of the member 12.

A horizontal platform 18 is removably attached to the top of the support member 12. Attached to the edges of the platform are depending side members 20 coupled to horizontal cross bars 22, 23, 24 in the form of dowels. At least one of the cross bars 23, located near the center of the platform, extends the width of the platform between the depending side members. This central bar 23, spaced from the bottom surface of the platform, engages the L-shaped cut-out 16 in the of the upright support member to form a firm but removable interconnection.

The outer cross bars 22, 24 extend outward approximately one inch from the outer surfaces of each side member 20 and engage inverted L-shaped openings 26 in the bottom edges of a inverted box 28 which loosely fits down over the platform as best illustrated in FIG. 2. Except for its open bottom, the box 28 is sealed and has, in one sidewall, an air fitting 30 through which a continuous flow of pressurized air is pumped. When filled with air, the box 28 is buoyant; hence the top portions of the L-shaped openings 26 have a slight negative pitch for preventing the buoyant box from floating from its engagement with the cross bars 22, 24.

The continued flow of air into the box 28 fills the box and then escapes through the openings 26 and into the aquarium to aerate the water therein. The platform 18 within the box is preferably covered with pebbles or small rock and should contain a small hole 19 or narrow floor slots for draining off water that may have been carried onto the platform by crabs.

Crabs enter the habitat by climbing a ladder 32 formed of a relatively wide sheet of material such as plastic which also forms one end of a fence around the platform 18. The ladder is spaced about two inches from one end of the inverted box 29 and extends down at a steep angle from the edge of the platform 18 to a point about three inches from the base plate 10. The latter 32 has rungs comprising a matrix of closely spaced holes 33 about ¾ inches in diameter that enable a crab to climb up and onto the rock covered platform 18.

To provide seclusion to crabs and to improve the appearance of the habitat in an aquarium, the roof 34 of the box 28 is preferably larger than the area of the box and has a peripheral ledge so that rocks and other ornamentation may be applied thereto. So that the contents of the box may readily be observed, and to provide some illumination to the interior of the habitat, one or more transparent skylights 36 may be placed in the roof. Such skylights are preferably raised above the level of the roof to pevent roof gravel from blocking light to the interior.

As best shown in FIG. 2, the pet crab dwelling consists of but three parts so that assembly and disassembly is very simple. The unit including the platform 18 contains a central cross bar 23 under the platform that engages the L-shaped cut-out 18 on the top surface of the upright support member 12. The inverted box 28 has inverted L-shaped cut-outs 26 on its lower edges for engaging cross bars 22, 24 that extend from the sides of the platform 18.

I claim:

1. A chamber for submergence in an aquarium for admitting and housing small amphibious animals such as crabs in a dry area, said chamber comprising:

a base plate within the aquarium, said base plate having an upright support member attached thereto;

a substantially horizontal platform coupled to said upright support member, said platform having a floor and side walls extending above and below the level of said floor, at least two of said side walls being parallel, a third platform side wall formed as an access ladder;

an inverted air tight box loosely covering said platform and coupled thereto, the side walls of said box extending below the level of the floor of said platform, one of said box side walls being spaced from said third platform side wall to enable entry to said platform of amphibious animals; and means for admitting pressurized air into said inverted box.

2. The chamber claimed in claim 1 wherein said inverted box is detachably coupled to the side walls of said platform.

3. The chamber claimed in claim 2 wherein the side walls of said inverted box are slotted to removably engage cross bars extending from the two parallel side walls of said platform.

4. The chamber claimed in claim 2 wherein said inverted box has a substantially flat horizontal top surface with peripheral fencing means for retaining ornamental features placed on said surface.

5. The chamber claimed in claim 4 wherein the top surface of said inverted box has a transparent window for illuminating the interior of said box and said platform.

6. The chamber claimed in claim 5 wherein said transparent window is raised above said top surface for preventing gravel placed on the top surface from blocking illumination to the interior of said chamber.

7. The chamber claimed in claim 1 wherein said third platform side wall forms a ladder extending from said platform down toward said base plate.

8. The chamber claimed in claim 7 wherein said ladder is a sheet of sheet material with a plurality of closely spaced holes therethrough.

9. The chamber claimed in claim 7 including means in said platform for draining accumulated water from said platform.

* * * * *